Patented June 8, 1954

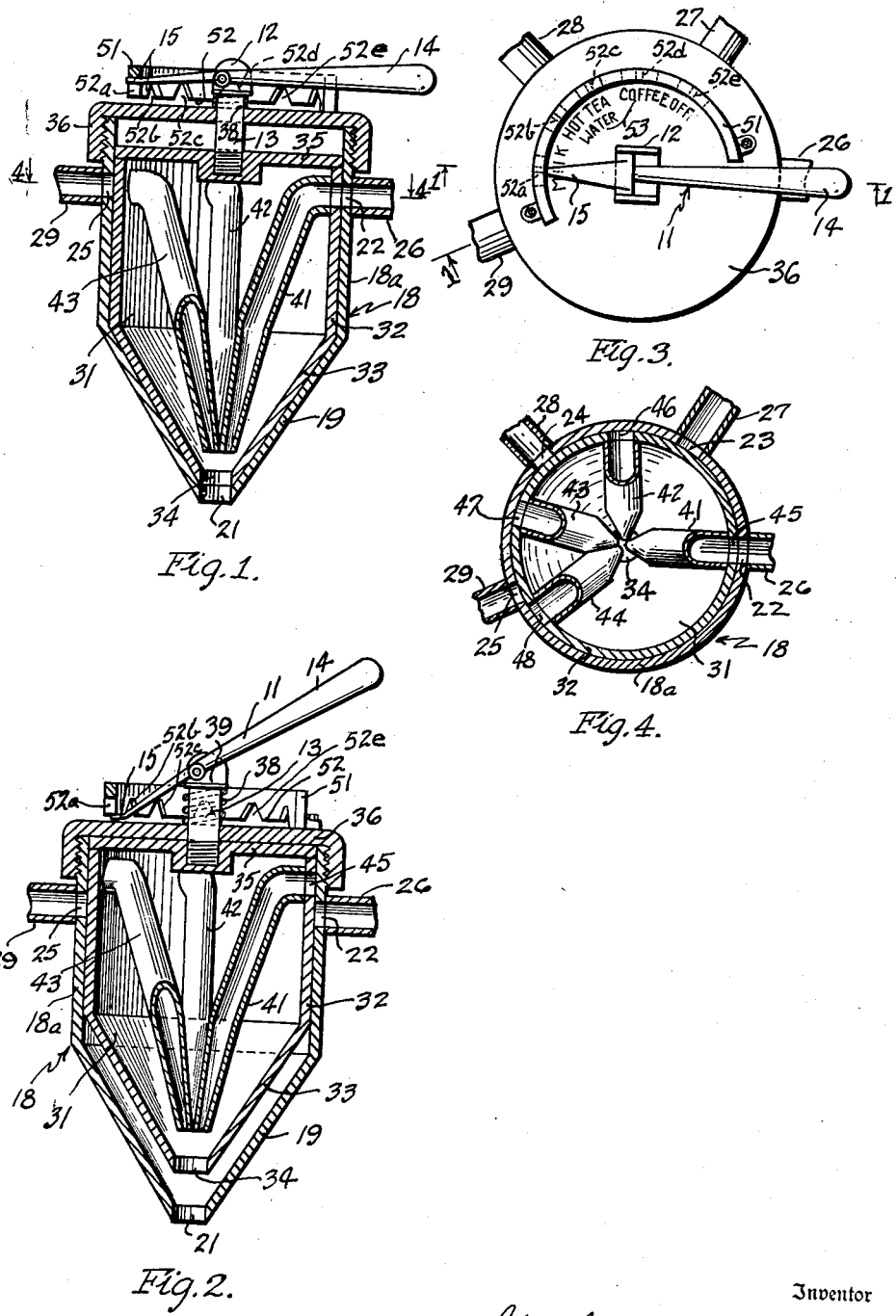

2,680,455

UNITED STATES PATENT OFFICE 2,680,455

SELECTOR VALVE FOR DISPENSING LIQUID FROM A PLURALITY OF RECEPTACLES

Stephen J. Raiteri, Stamford, Conn.

Application May 8, 1952, Serial No. 286,659

7 Claims. (Cl. 137—555)

This invention relates to valves and particularly to dispensing or draw-off valves for selectively drawing off any one of a plurality of separate fluids from different sources or containers. Valves of this type have many uses, such, for example, as in connection with beverage urns used in restaurants and similar places to make and dispense coffee, tea, milk, hot water and the like.

This application covers an improvement in the valve disclosed in my copending application Serial No. 17,475, filed March 27, 1948, Patent No. 2,638,839, issued May 19, 1953.

An object of this invention is to provide an improved valve constructed and arranged to permit a single valve unit being employed to draw off any one of a number of different fluids from different containers.

A further object is to provide a draw-off valve of this type which can be easily and quickly positioned to draw off any one of several fluids, which when so positioned can be easily opened by a user without having to be grasped by hand, and which will automatically close when released.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

In this drawing:

Fig. 1 is a central section on the line 1—1 of Fig. 3, through a draw-off valve constructed in accordance with one embodiment of this invention, showing the parts in open position to draw off a selected fluid;

Fig. 2 is a similar view showing the valve shut;

Fig. 3 is a top plan of the embodiment shown in Figs. 1 and 2, and

Fig. 4 is a horizontal section on the line 4—4 of Fig. 1.

The illustrated form of the invention is shown as a five-way valve operated by a handle or lever 11 pivotally mounted between supporting ears 12 on the upper end of a stud 13, and having a gripping end 14 for the user and an oppositely projecting end 15 for a purpose to be later described.

The valve shown comprises an outer circular casing 18 including an upper cylindrical body portion 18a and a conical lower portion 19 having a discharge opening 21 in its lower end. The cylindrical body wall is provided with a series of inlet openings 22, 23, 24 and 25 suitably spaced around the casing and located in a given transverse radial plane of the casing. Each opening is connected by a separate conduit to a separate supply container (not shown). The opening 22 at the right in Fig. 4 may be connected by a conduit 26 with a supply of milk, for example. The next opening 23 may be connected by a conduit 27 to a supply of coffee in an urn, for example. The next opening may be connected by a conduit 28 with a supply of hot water for making tea, while the opening 25 may be connected by a conduit 29 with the hot water space of a coffee urn. Any other beverages may, of course, be supplied in place of those mentioned.

Within the casing 18 is a rotary valve element or member 31 in the form of a hollow shell of substantially the same shape as the casing 18 including a cylindrical body 32 and a conical lower portion 33 provided with a discharge opening 34 in alignment with the discharge opening 21 in the casing, as shown in Figs. 1 and 2. The valve element and casing are relatively rotatable and relatively movable axially, the valve element being shorter than the casing and fitting snugly within the casing. The valve element has a closed top wall 35 which can be provided by welding it in place after the remainder of the element has been formed and assembled. The lever supporting stem 13 is secured in the top wall 35 of the valve element and extends upwardly through a cap 36 on the casing 18, which is preferably threaded to the casing and removable therefrom for cleaning and assembly purposes. The valve element 31 is normally held in raised position relatively to the casing 18, as shown in Fig. 2, by a helical spring 38 compressed between the casing cap 36 and a collar 39 on the lever supporting stem 13, in which position the inlet openings in the casing are located on a different transverse radial plane from the openings in the valve element 31 and the valve is thereby closed, as will appear hereafter.

On the inner side of the movable valve element 31 are mounted a series of short nozzles or pipes 41, 42, 43 and 44 secured to the inner wall of the valve element and each communicating with one of a series of openings 45, 46, 47 and 48 spaced around the upper side wall of the valve element and in the same transverse radial plane.

Each nozzle extends downwardly to a point adjacent the discharge opening 34 through which fluid is delivered. The nozzle 41 is connected to an opening 45 in the valve element adapted to register with the inlet opening 22 connected to the conduit 26 which may lead to the milk supply.

In the same manner the remaining nozzles 42, 43 and 44 are connected to openings 46, 47 and 48 respectively, each adapted to register with one of the inlet openings 23, 24 and 25 connected by conduits 27, 28 and 29 respectively to sources of other beverages. The openings 45, 46, 47 and 48 are circumferentially spaced around the valve element in different axial planes, but in the same transverse radial plane. As hereafter described, by operating the valve element by the handle 14 these various nozzles may be brought into alignment with the various inlet openings in the casing 18 and the conduits 26 to 29 leading to them from the different beverage sources.

Mounted on the top of the casing cap 36 is an arcuate rail 51 having a lower notched edge 52 adapted to be engaged by the point 15 of the handle or lever 11. Each individual notch is so located that when the point 15 is engaged in one of the notches the handle and valve element will be in a position to serve a selected beverage merely by depressing the handle. The cap 36 of the casing has indicia 53 thereon under each notch to indicate to a user the beverage which the valve element is set to supply when the point is in the associated notch. The projecting point 15 of the lever runs under the rail and is engageable in the notches.

In operation, the spring 38 normally retains the valve element 31 in raised position relatively to the casing 18, as indicated in Fig. 2, in which position it will be apparent that the inlet openings in the casing are shut by the cylindrical wall of the valve element, due to the fact that in this position the inlet openings are on a different radial plane from the openings in the valve element. If it is desired to draw off milk, for example, the handle 14 is lifted to free the point 15 thereof from engagement with the lower notched edge of the rail 51 whereupon the handle can be turned to rotate the valve element in the casing. When the lever reaches the position shown in Fig. 3 with the point 15 under the notch marked "Milk," the relative positions of the casing and valve element will be as shown in Fig. 2, in which the opening 45 in the valve element will be in the same axial or radial plane as the inlet opening 22 in the casing which is connected to the milk supply pipe 26, but, it will be noted that in this position the series of inlet ports in the casing and the openings in the valve element are still in different radial planes, as shown in Fig. 2, so that the draw-off valve is still shut. However, in this position it is only necessary to depress the lever handle 14 to press the stem 13 inwardly and shift the valve element downwardly in the casing 18 against the pressure of the spring 38, and thus bring the opening 45 and the inlet opening 22 into registry, as shown in Fig. 1, to dispense milk from the conduit 26 through the nozzle 41 and the outlet 21. While doing this the end 15 of lever 14 is in the notch 52a in rail 51 opposite the word "Milk" and will hold the lever so it cannot be swung in a horizontal plane to turn the valve element 31, and only milk can be supplied while the end of the lever is in this notch. Upon release of the handle 14 the spring 38 immediately returns the valve element to raised position and shuts off the flow. Thereafter it is only necessary to depress the handle whenever a further supply of milk is wanted. When a different beverage is wanted the lever can be lifted to release the point from engagement with the notch 52a in notched rail 51 and then turned to bring the point under the notch indicated as proper for the beverage desired, which can then be obtained by depressing the handle as above described. This operation brings into registry the proper inlet opening and opening in the valve element to obtain the beverage wanted. Thus when the end of the hand lever is in the second notch 52b the nozzle 44 is in alignment with conduit 29 and will communicate with it when valve member 31 is depressed. When the end of the lever is in notch 52c nozzle 43 is in alignment with conduit 28, and when in notch 52d nozzle 42 is in alignment with conduit 27. When the lever end is in notch 52e no nozzle is in alignment with any supply conduit, so depressing the valve member will not connect any of them to any supply conduit. This position is therefore designated as the "off" position.

By means of the present invention a single draw-off valve is adapted to supply any one of a number of different beverages. When positioned for a selected beverage the valve can be opened merely by depressing the handle 14 and will close automatically under impulse of the spring 38 when the handle is released. When properly set, a given beverage can be repeatedly drawn off merely by depressing the handle 14, without requiring that it be grasped by the user, thus expediting and simplifying the drawing-off operation.

Although I have described a specific embodiment of the invention in detail, it will be apparent that the invention can be variously modified and adapted within the scope of the appended claims.

Having thus set forth the nature of my invention, I claim:

1. A dispensing control comprising an outer casing provided with a series of openings communicating with different conduits, a movable hollow shell forming a valve element in the casing having a series of openings in its side walls movable into alignment with the respective openings in the casing by movement of the shell relative to the casing, discharge openings in the bottom of the shell and casing, nozzles in the shell forming conduits leading from the respective openings in its side wall to the discharge openings to conduct liquids from the respective side wall openings separately to the discharge openings, and manual means for moving the shell to align up the various openings in its side wall with those in the casing.

2. A dispensing control comprising a cylindrical casing having a plurality of inlet openings circumferentially spaced on different axial planes around said casing and in a given radial plane, and having an outlet adjacent the end of the casing, a relatively rotatable cylindrical valve element having a plurality of openings spaced circumferentially around said element normally on different axial planes from the planes of said inlet openings and on a different radial plane, whereby said inlet openings are normally closed by the valve element, a conduit separately connected to each opening in said valve element and extending to the outlet to conduct fluid from its respective opening to said outlet, and mechanism for rotating said valve element relatively to said casing to position a selected inlet opening in the same axial plane with a selected opening in said valve element, and to then move said valve element axially relatively to said casing to bring said selected openings into registry, whereby fluid is conducted from the selected inlet opening to said outlet.

3. A dispensing control comprising a cylindrical casing having a plurality of inlet openings circumferentially spaced on different axial planes around said casing and in a given radial plane, and having an outlet adjacent the end of the casing, a relatively rotatable cylindrical valve element having a plurality of openings spaced circumferentially around said element normally on different axial planes from the planes of said inlet openings and on a different radial plane, whereby said inlet openings are normally closed by the valve element, a conduit separately connected to each opening in said valve element and leading to the outlet to conduct fluid from said opening to said outlet, and mechanism for rotating said valve element relatively to said casing to position a selected inlet opening in the same axial plane with a selected opening in said valve element, and to then move said valve element axially relatively to said casing to bring said selected openings into registry, whereby fluid is conducted from the selected inlet opening to said outlet, and means yieldingly urging said valve element axially of said casing to yieldingly maintain said selected openings out of registry.

4. A dispensing control comprising a cylindrical casing having a plurality of inlet openings circumferentially spaced on different axial planes around said casing and in a given radial plane, and having an outlet adjacent the end of the casing, a relatively rotatable cylindrical valve element having a plurality of openings spaced circumferentially around said element normally on different axial planes from the planes of said inlet openings and on a different radial plane, whereby said inlet openings are normally closed by the valve element, means separately connected to each valve element opening to direct fluid therefrom to said outlet, a pivoted lever supported in axial alignment on said valve element for rotating said valve element relatively to said casing to position a selected inlet opening in the same axial plane with a selected opening in said valve element, and means adapted to hold one end of said lever whereby said lever can be swung to then move said valve member axially relatively to said casing to bring said selected openings into registry, whereby fluid is directed from the inlet port to said outlet.

5. A dispensing control comprising a cylindrical casing having a plurality of inlet openings circumferentially spaced on different axial planes around said casing and in a given radial plane, and having an outlet adjacent the end of the casing, a relatively rotatable cylindrical valve element having a plurality of openings spaced circumferentially around said element normally on different axial planes from the planes of said inlet openings and on a different radial plane, whereby said inlet openings are normally closed by the valve element, means separately connected to each valve element opening to direct fluid therefrom to said outlet, a pivoted lever supported in axial alignment on said valve element for rotating said valve element relatively to said casing to position a selected inlet opening in the same axial plane with a selected opening in said valve element, means adapted to hold one end of said lever whereby said lever can be swung to then move said valve member axially relatively to said casing to bring said selected openings into registry, whereby fluid is directed from the inlet port to said outlet, and means yieldingly holding said valve member in position to maintain said openings out of registry and said inlet openings closed.

6. A dispensing control comprising a cylindrical casing having a plurality of inlet openings circumferentially spaced on different axial planes around said casing and in a given radial plane, and having an outlet adjacent the end of the casing, a relatively rotatable and axially movable cylindrical valve element having a plurality of openings spaced circumferentially around said member normally on different axial planes from the planes of said inlet openings and on a different radial plane, whereby said inlet openings are normally closed by the valve element, means separately connected to each valve element opening to direct fluid therefrom to said outlet, a lever pivotally supported on said valve element for rotating said element relatively to said casing to position a selected inlet opening in the same axial plane with a selected opening in said valve element, and a rail mounted on said casing in position to engage an end of said lever whereby said lever can be operated to move said valve member axially relatively to said casing to bring said selected openings into registry, whereby fluid is directed from the inlet opening to said outlet.

7. A dispensing control comprising a cylindrical casing having a plurality of inlet openings circumferentially spaced on different axial planes around said casing and in a given radial plane, and having an outlet adjacent the end of the casing, a relatively rotatable and axially movable cylindrical valve element having a plurality of openings spaced circumferentially around said member normally on different axial planes from the planes of said inlet openings and on a different radial plane, whereby said inlet openings are normally closed by the valve element, means separately connected to each valve element opening to direct fluid therefrom to said outlet, a lever pivotally supported on said valve element for rotating said element relatively to said casing to position a selected inlet opening in the same axial plane with a selected opening in said valve element, a rail mounted on said casing in position to engage an end of said lever whereby said lever can be operated to move said valve member axially relatively to said casing to bring said selected openings into registry, whereby fluid is directed from the inlet opening to said outlet, and indicia on said rail for preselecting the inlet and valve element openings to be brought into registry.

References Cited in the file of this patent

UNITED STATES PATENTS

| Number | Name | Date |
|---|---|---|
| 47,546 | Hurd | May 2, 1865 |
| 244,537 | Booton | July 19, 1881 |